(12) United States Patent
Lomet et al.

(10) Patent No.: US 8,386,440 B2
(45) Date of Patent: Feb. 26, 2013

(54) DATABASE CORRUPTION RECOVERY SYSTEMS AND METHODS

(75) Inventors: David B. Lomet, Redmond, WA (US); Roger S. Barga, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 349 days.

(21) Appl. No.: 11/125,806

(22) Filed: May 10, 2005

(65) Prior Publication Data

US 2006/0259518 A1    Nov. 16, 2006

(51) Int. Cl.
*G06F 7/00* (2006.01)
*G06F 13/00* (2006.01)
*G06F 11/00* (2006.01)

(52) U.S. Cl. ............................ 707/676; 711/144; 714/16

(58) Field of Classification Search ...... 707/8, 202–203, 707/676; 711/144; 714/16
See application file for complete search history.

(56) References Cited

U.S. PATENT DOCUMENTS

| | | | | |
|---|---|---|---|---|
| 5,212,788 | A * | 5/1993 | Lomet et al. ................. | 707/201 |
| 5,333,314 | A * | 7/1994 | Masai et al. ................. | 707/202 |
| 5,812,565 | A * | 9/1998 | Fendt et al. ................. | 714/764 |
| 5,893,117 | A * | 4/1999 | Wang ............................ | 707/203 |
| 6,374,264 | B1 * | 4/2002 | Bohannon et al. ........... | 707/202 |
| 7,062,611 | B2 * | 6/2006 | Fu ................................. | 711/144 |
| 7,254,752 | B1 * | 8/2007 | Don et al. ..................... | 714/52 |
| 2003/0149845 | A1 | 8/2003 | Fu | |
| 2005/0097141 | A1 * | 5/2005 | Loafman et al. ............. | 707/200 |
| 2005/0187872 | A1 * | 8/2005 | Schmidt et al. .............. | 705/40 |

OTHER PUBLICATIONS

"Aries: A Transaction Recovery Method Supporting Fine-Granularity Locking and Partial Rollbacks Using Write-Ahead Logging", by: C. Mohan, published 1992. http://delivery.acm.org/10.1145/130000/128770/p94-mohan.pdf?key1=128770&key2=4684202911&coll=Guide&dl=Guide&CFID=2312196&CFTOKEN=14846917.*

"The Risk of Data Corruption in Microprocessor-based Systems", by Robert Horst, Published 1993 http://ieeexplore.ieee.org/stamp/stamp.jsp?tp=&arnumber=627360&isnumber=13650.*

"Aries: A Transaction Recovery Method Supporting Fine-Granularity Locking and Partial Rollbacks Using Write-Ahead Logging", by: C. Mohan, Published 1992 http://142.103.6.5/~rap/teaching/504/2008/readings/p94-mohan.pdf.*

Flashback Technology: Recovering from Human Errors, by: Oracle, published Nov. 2003 http://www.oracle.com/technology/deploy/availability/pdf/TWP_HA_FlashbackOverview_10g_111503.pdf.*

The Risk of Data Corruption in Microprocessor-based Systems, by: Robert Horst, Published 1993. http://ieeexplore.ieee.org/stamp/stamp.jsp?tp=&arnumber=627360&isnumber=13650.*

"Flashback Technology: Recovering from Human Errors", by: Oracle, Published Nov. 2003. http://www.oracle.com/technology/deploy/availability/pdf/TWP_HA_FlashbackOverview_10g_111503.pdf.*

(Continued)

*Primary Examiner* — Apu Mofiz
*Assistant Examiner* — Chelcie Daye
(74) *Attorney, Agent, or Firm* — Lee & Hayes, PLLC

(57) ABSTRACT

The subject invention pertains to data store corruption recovery. More specifically, the invention concerns systems and methods for identifying corrupt data in a manner that prevents de-committing or removal of valid or consistent transactions from a database. This can be accomplished at least in part by logging the identities of data items that a transaction reads. Furthermore, the subject invention provides for employment of a multi-version (or transaction-time) database to reduce significantly reduce any down time or database unavailability caused by a corrupt transaction and associated corrupt data items. Accordingly, no backups need to be installed and only updates by the original corrupt transaction and transactions that read corrupt data need to be de-committed or removed.

20 Claims, 16 Drawing Sheets

OTHER PUBLICATIONS

"The Risk of Data Corruption in Microprocessor-based Systems", by: Robert Horst, Published 1993 http://ieeexplore.ieee.org/stamp/stamp.jsp?tp=&arnumber=627360.*

Hal Berenson, Phil Bernstein, Jim Gray, Jim Melton, Elizabeth O'Neil, and Patrick O'Neil, A Critique of ANSI SQL Isolation Levels, SIGMOD Conference, 1995, pp. 1-10.

Philip A. Bernstein, Vassos Hadzilacos, and Nathan Goodman, Concurrency Control and Recovery in Database Systems, 1987, 370 pages, Addison-Wesley.

Lilian Hobbs and Ken England, Rdb/VMS A Comprehensive Guide, 1991, 352 pages, Digital Press.

Abdullah Uz Tansel, James Clifford, Shashi Gadia, Sushil Jajodia, Arie Segev, and Richard Snodgrass, Temporal Databases: Theory, Design, and Implementation, 1993, 633 pages, Benjamin/Cummings Publishing Company.

International Search Report and Written Opinion dated Aug. 4, 2008 for PCT Application Serial No. PCT/US06/14266, 13 Pages.

The Korean Office Action mailed Aug. 27, 2012 for Korean Patent Application No. 10-2007-7025111, a counterpart foreign application of U.S. Appl. No. 11/125,806, 11 pages.

Philip Bohannon, et al. Using Codewords to Protect Database Data from a Class of Software Errors. ICDE 1999: 276-285.

Philip Bohannon, et al. Detection and Recovery Techniques for Database Corruption. IEEE Trans. Knowl. Data Eng. 15(5): 1120-1136 (2003).

David Lomet, et al. Transaction-Time Databases. 33 pp., 1993.

Tammy Bednar et al. Flashback Technology: Recovering from Human Errors. Oracle Corporation. Nov. 2003. 13 pp.

David Lomet, et al. Exploiting a History Database for Backup. Proceedings of the 19th VLDB Conference, Dublin, Ireland, 1993. pp. 380-390.

David Lomet, et al. Access Methods for Multiversion Data. Association fo rComputing Machinery. 1989. pp. 315-324.

K.P. Eswaran, et al. The Notions of Consistency and Predicate Locks in a Database System. Communications of the ACM. vol. 19, No. 11. Nov. 1976. pp. 624-633.

C. Mohan, et al. Aries: A Transaction Recovery Method Supporting Fine-Granularity Locking and Partial Rollbacks Using Write-Ahead Logging. ACM Transactions on Database Systems. vol. 17, No. 1. Mar. 1992. pp. 94-162.

* cited by examiner

DATABASE CORRUPTION RECOVERY SYSTEMS AND METHODS

TECHNICAL FIELD

The subject invention relates generally to database management systems and more particularly toward recovery systems and methods.

BACKGROUND

Transactions are assumed to have ACID properties. More specifically, the transactions should be atomic, consistent, isolated, and durable. Database mechanisms enforce atomicity, isolation and durability, the "AID" properties. User written transaction code is responsible for consistency (the "C"), which means that a transaction should take a previously consistent state and update it creating a new consistent state. Unfortunately, user transactions can be flawed and lead to inconsistent, invalid or corrupt states.

One strong reason for utilizing database systems is their promise to guard the integrity of the data they store. Database systems implement transactions to provide atomicity with its promise of all or nothing execution, hence preventing partial transaction executions in which, for example, money intended to be transferred between accounts is only withdrawn or credited, but not both. Database systems implement redo recovery and forced logging so that once the database responds accepting responsibility for a transaction's updates, those updates are guaranteed to be included in the database state. In other words, the updates are durable. Such systems also implement isolation so that that the effects of one transaction do not interfere with the effects of another, thereby providing the illusion that transactions are executed serially in order. However, these commonly known techniques do not directly deal with the problem of data corruption.

Data can be corrupted in many ways. One way data can be corrupted is for a disk to fail either catastrophically or with a soft failure where some bits are lost. This is called media failure and dealing with it is referred to as media recovery. There are a number of approaches for database systems to provide media recovery. For example, replication, either using mirrors or some form of RAID (Redundant Array of Independent Disks) may provide enough redundancy for the corrupt or bad data to be reconstructed. More classically, database systems generate regular backups, a special form of replica optimized for high-speed writing and reading (e.g., tape backup). Since transactions can execute and commit between backups, media recovery involves loading the backup (called restore) and applying a redo recovery using a media recovery log. The media recovery log is a special log that records all transaction updates since the backup was taken. The media recovery log can be used to roll forward the restored backup. However, this process is arduous and usually results in a rather long outage.

Nevertheless, media recovery does not directly deal with the problem of erroneous transactions. The damage done by erroneous transactions is particularly pernicious because not only is data written by these transactions corrupted, but data written by all transactions that have subsequently read this data are likewise corrupted.

One technique used to eliminate data corruption induced by erroneous transactions is based on the media recovery technique described supra, where a backup is restored and a media recovery log is utilized to roll the database state forward. Blindly applied, however, media recovery would simply reconstruct corrupted data. To prevent such an occurrence, the media recovery process is conventionally halted before the current state of the database is recovered. More specifically, media recovery is permitted to continue until just before the corrupting transaction executed. This is called point in time recovery, and it does indeed remove the effects of the corrupting transaction.

Unfortunately, point in time recovery systems are a heroic measure both in terms of cost to use it and the impact that it has on a database, its users, and those responsible for managing the database. Point in time recovery is costly to perform in that it introduces a long outage while the backup is used to restore the database and the media recovery log is used to roll the state of the database forward to a desired time just prior to the corrupt transaction. Accordingly, this can seriously impair database availability. Moreover, all transactions that have committed later than the corrupting transaction are de-committed. In a high performance transaction application, this can result in hundreds even thousands, of transactions being de-committed. These transactions are subsequently re-submitted for execution in some manner to limit the damage caused by the corruption. This can be a very laborious process at least in part because re-executing any of these transactions might result in different results than their original execution.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

Briefly described the subject invention concerns systems and methods for combating corruption. According to an aspect of the invention, systems and methods are provided that drastically reduce or eliminate de-committing or removal of valid transactions upon corruption. More specifically an initially corrupt data item resulting from a flawed or incorrect transaction can be identified. This initial corrupt data item can then be utilized to determine derived corrupt data items, which are corrupt by virtue of their dependency on the initially corrupt data item. According to an aspect of the invention, a log can be maintained to facilitate identification of derived corrupt items. This log can include one or more records identifying the data items that a transaction read in addition to the usual records identifying the data items that a transaction wrote or updated. The corrupt items both initial and derived or dependent can then be marked as invalid on a data store to distinguish them from valid data items.

In accordance with an aspect of the invention, the provided systems and methods enable interaction and transaction processing against a data store with invalid data. In other words, transaction processing can continue almost uninterrupted by a corrupt or flawed transaction that generates corrupt data.

According to another aspect of the invention, invalid data items can be queried to enable examination and perhaps alteration of invalid data. For example, a SQL query with a special keyword identifying invalid data can be employed.

In accordance with another aspect of the invention, corrective action can be generated and applied to a data item as well as its dependent items to make invalid data valid once again.

According to still another aspect of the subject invention, a multi-version or transaction time database can be employed in conjunction with the other aspects of the invention. A transaction time database eliminates the need to retrieve and install a backup database upon corruption detection thereby drastically enhancing the ability of a database system to cope with corrupt transactions, among other things.

Aspects of the subject invention provide for improvements in corruption recovery that, among other things, significantly reduces the number of de-committed transactions, specifically regarding valid transactions that occur after a corruption. Furthermore, the process for dealing with corrupt data utilizing a transaction time database results in a much shorter outage than is currently the case for conventional point-in-time recovery.

To the accomplishment of the foregoing and related ends, certain illustrative aspects of the invention are described herein in connection with the following description and the annexed drawings. These aspects are indicative of various ways in which the invention may be practiced, all of which are intended to be covered by the present invention. Other advantages and novel features of the invention may become apparent from the following detailed description of the invention when considered in conjunction with the drawings.

DETAILED DESCRIPTION

The present invention is now described with reference to the annexed drawings, wherein like numerals refer to like or corresponding elements throughout. It should be understood, however, that the drawings and detailed description thereto are not intended to limit the invention to the particular form disclosed. Rather, the intention is to cover all modifications, equivalents, and alternatives falling within the spirit and scope of the present invention.

As used in this application, the terms "component" and "system" and the like are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Furthermore, the subject invention may be implemented as a method, apparatus, or article of manufacture using standard programming and/or engineering techniques to produce software, firmware, hardware, or any combination thereof to control a computer to implement the disclosed invention. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the subject invention.

Figure 1:
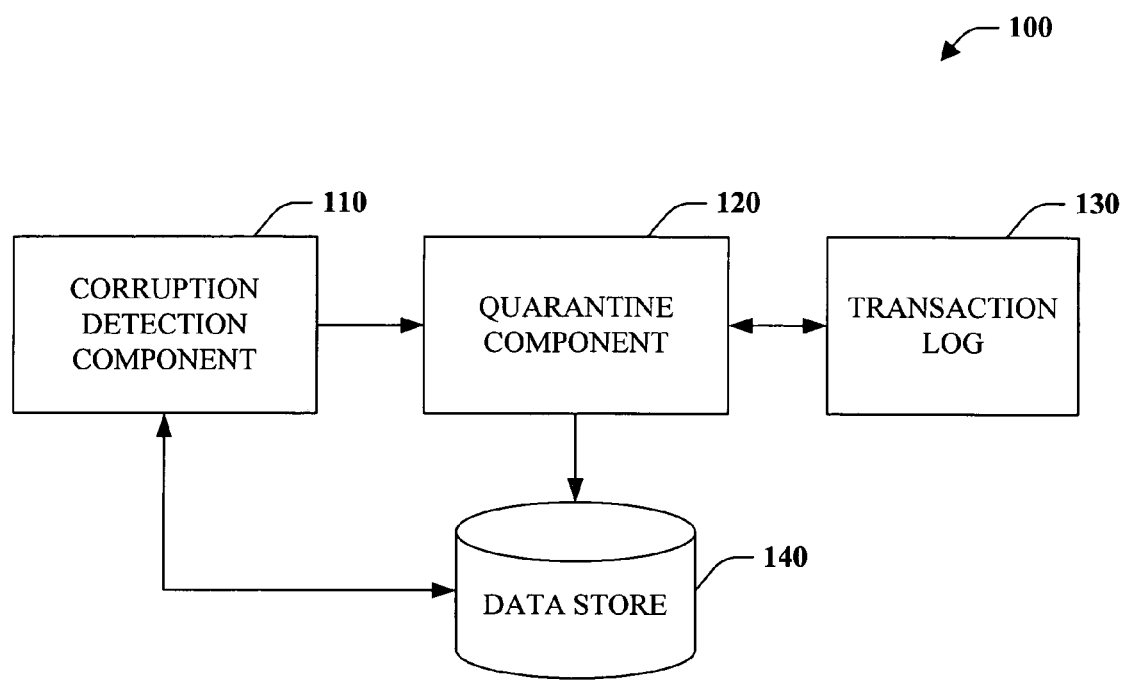
FIG. 1 is a block diagram of a corruption recovery system in accordance with an aspect of the subject invention.

Turning initially to FIG. 1, corruption recovery system 100 is depicted in accordance with an aspect of the subject invention. Corruption recovery system 100 includes a corruption detection component 110, a quarantine component 120, a transaction log 130, and a data store 140. Data corruptions can be either physical and/or logical. For example, environmental effects can cause a soft error, which alters one or more data items. Additionally or alternatively, a transaction can be executed that produces unintended effects. Accordingly, corruption detection component 110 can monitor both transactions as well as a data store 140. Based on the input received, component 110 can detect and/or facilitate detection of one or more data item corruptions. The identity and other information concerning a detected data corruption can be forwarded to quarantine component 120. Quarantine component 120 can receive this initial corrupt data item(s) and determine dependent data items. Stated differently, the quarantine component 120 can identify additional data items that derive from the initial corrupt data, for example, a transaction reads the corrupt data and utilizes such data to generate and store another data item. That stored data item can also be viewed as corrupt by virtue of its dependency on a corrupt item. Quarantine component 120 can utilize transaction log 130 to facilitate identification of dependent corrupt data. The transaction log 130 can be a data store residing on a computer readable medium. The log 130 can include the data items read and written by each transaction. Upon identification of an initial corrupt data item and corrupt data items derived therefrom, the quarantine component 120 can isolate these corrupt data items from the rest of the data on data store 140. Data store 140 is an article of manufacture or a computer readable medium such as a database providing durable storage for data items. According to an aspect of the subject invention, data store 140 can be a multi-version or transaction time database as described in more detail infra. According to an aspect of the invention, corrupt data can be isolated from valid data via the quarantine component 120 by marking corrupt data as invalid. For example, the quarantine component 120 can mark each corrupt data item as invalid in a data item header or other associated metadata.

Figure 2:
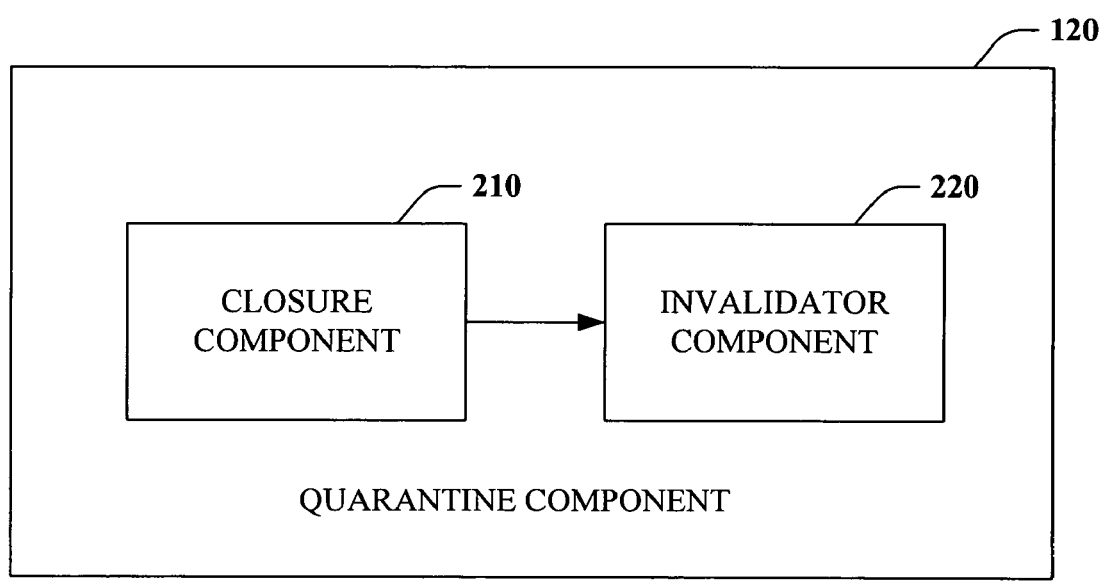
FIG. 2 is a block diagram of a quarantine component in accordance with an aspect of the subject invention.

Turning to FIG. 2, a quarantine component 120 is depicted in accordance with an aspect of the subject invention. Quarantine component 120 receives identification of a corrupt transaction from detection component 110 (FIG. 1), determines the dependent data items, and isolates corrupt data from valid data. To facilitate such functionality, quarantine component 120 can include a closure component 210 and an invalidator component 220. Closure component 210 computes the closure of all data written by transactions impacted by corrupt data. Essentially, such a process involves computing C(DS), which denotes the exact data items or versions thereof that are corrupt in the data store. This can be expressed in terms of the initially corrupt data item or version of data and the items or versions of data written by one or more transactions that have read corrupt data. More specifically, this can be expressed as $C(T_c)=W(T_c)$, where $T_c$ is the transaction now to be corrupt and $W(T_c)$ denotes the exact data items that were written by $T_c$. This computation can be facilitated via a transaction log, as described infra. Furthermore, the closure component 210 can account for data items that were written by transactions known to be corrupt and then later overwritten by another transaction. This value was initially corrupt but became valid again when it was overwritten by a transaction that is not known to be corrupt. Once closure component 310 determines all the data items that are corrupt including the initially corrupt item and those derived from it, such information can be transmitted to invalidator component 220. Invalidator component 220 can subsequently quarantine the corrupt data items from other items by marking them as invalid. For example, header information or metadata associated with a data item can be marked to indicate that that data item or version thereof is invalid. Such data items would thus be invisible to regular transactions. Hence, the data store 140 (FIG. 1) does not need to be shut down, loaded with a backup, and rolled forward to a point just prior to the corruption. Moreover, perfectly valid transactions need not be de-committed and subsequently resubmitted for execution. Here, only the transactions and associated data items that are corrupt are de-committed. Further, the data store need not be shut down for an extended period of time and made unavailable for transaction processing.

Figure 3:
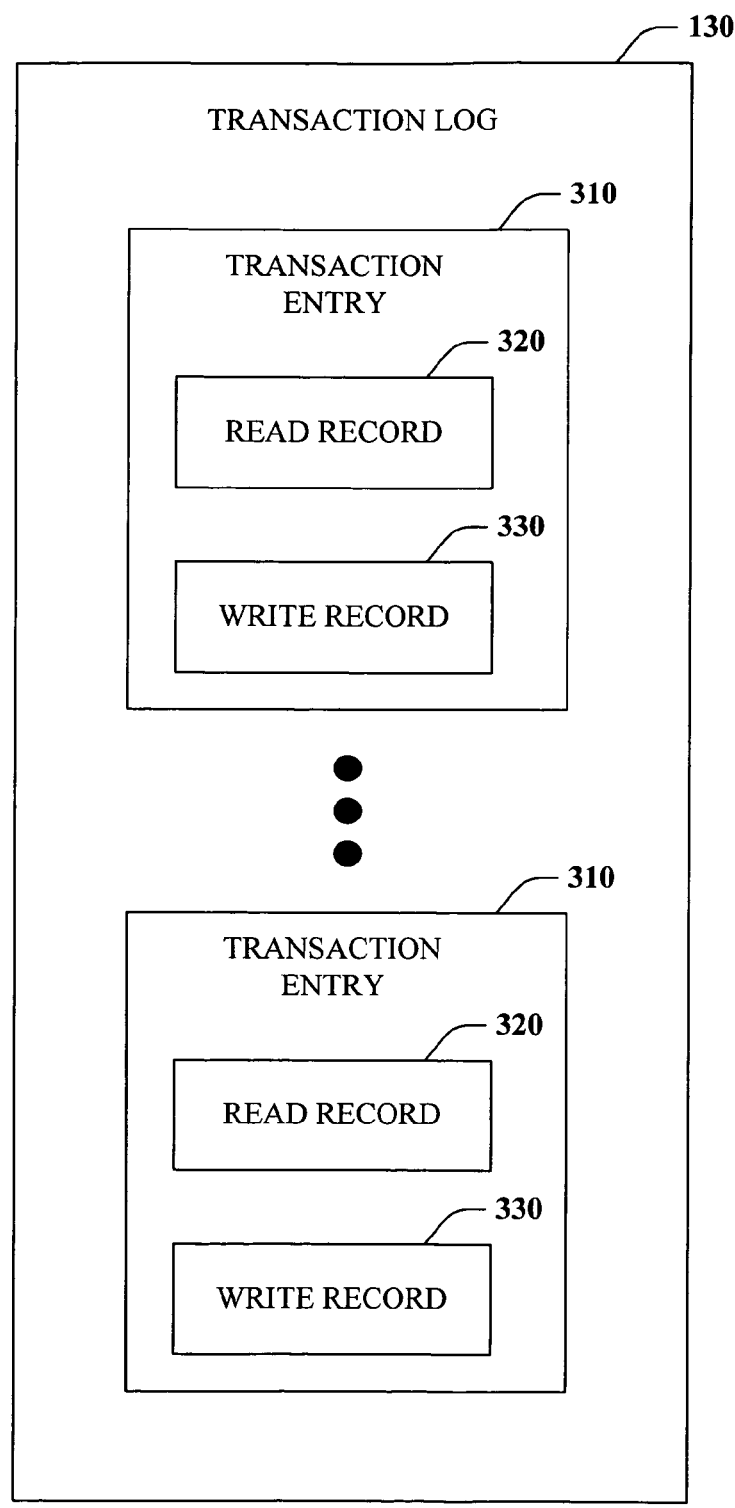
FIG. 3 is a block diagram of a transaction log in accordance with an aspect of the subject invention.

FIG. 3 illustrates a transaction log 130 in accordance with an aspect of the subject invention. The transaction log 130 is a store that includes information concerning transactions and data items and/or versions. Log 130 can be stored on a database or any other computer readable medium or article of manufacture. As exemplified in FIG. 3, a transaction log 130 can include one or more transaction entries 310 comprising read records 320 and/or write records 330. Every committed transaction can be recorded in the log 130. In particular, all data items or versions that are read by a transaction are recorded in the read record(s) 320. Additionally all data items or versions that are written or updated by the transaction are denoted in the write or update record(s) 330.

The "C" in "ACID" transactions stands for consistency, which is the responsibility of transaction code. When a transaction executes in its entirety, it inherently promises to make a transition from one consistent data store state to another. Hence, should a transaction be erroneous and corrupt the data store state, then of necessity, the entire effects of the transaction represent a corruption. Accordingly, either a transaction corrupts the data store or it does not.

Since a transaction in its entirety is either corrupt or consistent, the activities of the transaction, both its reads and its writes, can be treated as a whole. Consequently, it is not necessary to record and/or remember when a read occurred within a transaction. A transaction that reads any corrupt data will produce corrupt updates, even when the corrupt data is read after an update occurs. It is simply not possible to produce a consistent result were one to try to distinguish updates occurring before a corrupt read from those occurring after such a read. Accordingly, it is not important to remember when transaction reads occur relative to transaction updates. This permits the consolidation of all read information about a transaction into a single log record that can be written just before the transaction commits. If the log records are too large to easily be managed, the log record can be broken down into a number or records. Alternatively, a single read log record can be utilized.

It should be noted that not all reads need to be recorded in the log 130. In a recovery method using physiological log operations, these operations document the changed data, but in all cases assume that the changed data is read prior to being written. Hence, it may be unnecessary to include the reads of updated data in a read log record. Only reads of data that are not updated by the transaction need to be included. The reads for updated data are already logged via their update or write log records.

Returning to FIG. 1, the data store component 140 can be a transaction time or multi-version database in accordance with an aspect of the subject invention. A transaction time database stores and makes accessible all prior states of a database. Each transaction execution produces a new database state. Thus, there are a very large number of states to save. However, since transactions typically change only a very small part of the database state, most of the data can be shared between many states. Essentially, each database update introduces a new version of the data being changed. Each such version can subsequently be time stamped with the time of the transaction. One kind of query for this kind of database is an "as of" query that asks for the state of the database as of some selected time. This query is answered by locating the data that has the latest timestamp preceding the "as is" time. It is possible to construct a time-based index for this data that will direct the query to exactly the data constituting the database state as of the time requested.

Because a transaction time database contains all prior states of the database, it can provide the function of a backup. In other words, it provides a prior state of the database from which a media recovery log can be used to roll forward the state so as to reconstruct the current database state as is done conventionally. However, this "backup" requires no restore process, since the past states are always on-line. Thus, the large availability outage is immediately avoided. An additional virtue of this approach is that the "backup" can be queried utilizing various temporal queries such as "as of" querying and time travel querying where one asks for the history of some records in the database over some time period.

It should be clear that as with convention backups, a transaction time database backup can be used to provide "point-in-time" recovery as well, thus greatly reducing any outage duration resulting from data corruption. This can be accomplished by removing all data versions that were introduced after the corruption occurred. However, this by itself does nothing in terms of reducing the number of de-committed transactions.

Aspects of the subject invention described herein provide systems and methods for reducing the number of de-committed transactions by logging, among other things, transaction reads. Furthermore, corrupted data items can be removed or at least made invisible to normal querying. The result of these innovations coupled with the employment of a transaction time database as a backup, is that the outage period to provide recovery from corruption is almost eliminated and the number of de-committed transactions is reduced to exactly those that read corrupted data, usually an enormous reduction.

As mentioned, a transaction time database stores multiple versions of data, each version identified by a timestamp. When a transaction executes, it is assigned a timestamp for its execution. The timestamps for transactions can be consistent with the serialization order of the transactions. A transaction's timestamp can be stored in the versions of the data that the transaction writes to identify exactly when its version became the current version. $W(T)$ denotes the exact versions of data that are written by T, specifically those stamped with the timestamp of the transaction. For serializable transactions, that same timestamp identifies the versions of the data that are read by the transaction, in other words, the versions current "as of" time denoted by the transaction's timestamp.

For other forms of concurrency control, the time for the versions of data read can vary. It need not be identified in all cases exactly which version is the version that is read. For example, in snapshot isolation, this time is the start time of the transaction. For degree two transactions, where reads are not necessarily repeatable, there may be several timestamps used to identify the versions of data that are read. In all cases, $R(T)$ is used to denote the exact versions of data that are read by transaction T. The times used to identify versions of data that are read, should be carefully noted to precisely define $R(T)$.

Turning back to FIG. 2, recall that closure component 210 is employed to compute the closure of all data written by transactions impacted by corrupt data. This process involves computing $C(DB)$, which denotes the exact versions of data that are corrupt in the database. This can be expressed in terms of initially corrupt versions of data and the versions of data written by transactions that have read corrupt data. The following mathematical expressions define aspects of an exemplary closure computation executed on a database:

$C(T_c)_0 = W(T_c)$, where $T_c$ is the transaction know to be corrupt.      EQUATION A $C(T_c)_{i+1} = C(T_c)_i \cup \{W(T_i+1) | R(T_i+1) \cap C(T_c)_i \neq \phi\}$, where $T_i+1$ has a timestamp of $TS(T_i+1)$ and there are no transactions $T_j$ such that $TS(T_j) < TS(T_i) < TS(T_{i+1})$ and $R(T_j) \cap C(T_c)_i \neq \phi$,      EQUATION B $C(T_c) = C(T_c)_j$ such that there is no $T_{j+1}$, with $TS(T_j) < TS(T_{j+1})$ and $R(T_{j+1}) \cup C(T_c)_j \neq \phi$      EQUATION C Data store 140 (FIG. 1) can also be a conventional database in accordance with an aspect of the subject invention. It should be noted that the same computation described supra could be used to identify potentially corrupt data in a conventional database by simply removing the version identification. This essentially collapses all corrupt versions of a data item into a single corrupt instance of the data that is present in the current database. So long as the only transactions being considered are those that execute after the corrupt transaction, this computation would be effective as well. It could be used to avoid de-committing transactions that are not impacted by the initial corruption.

Figure 4A:
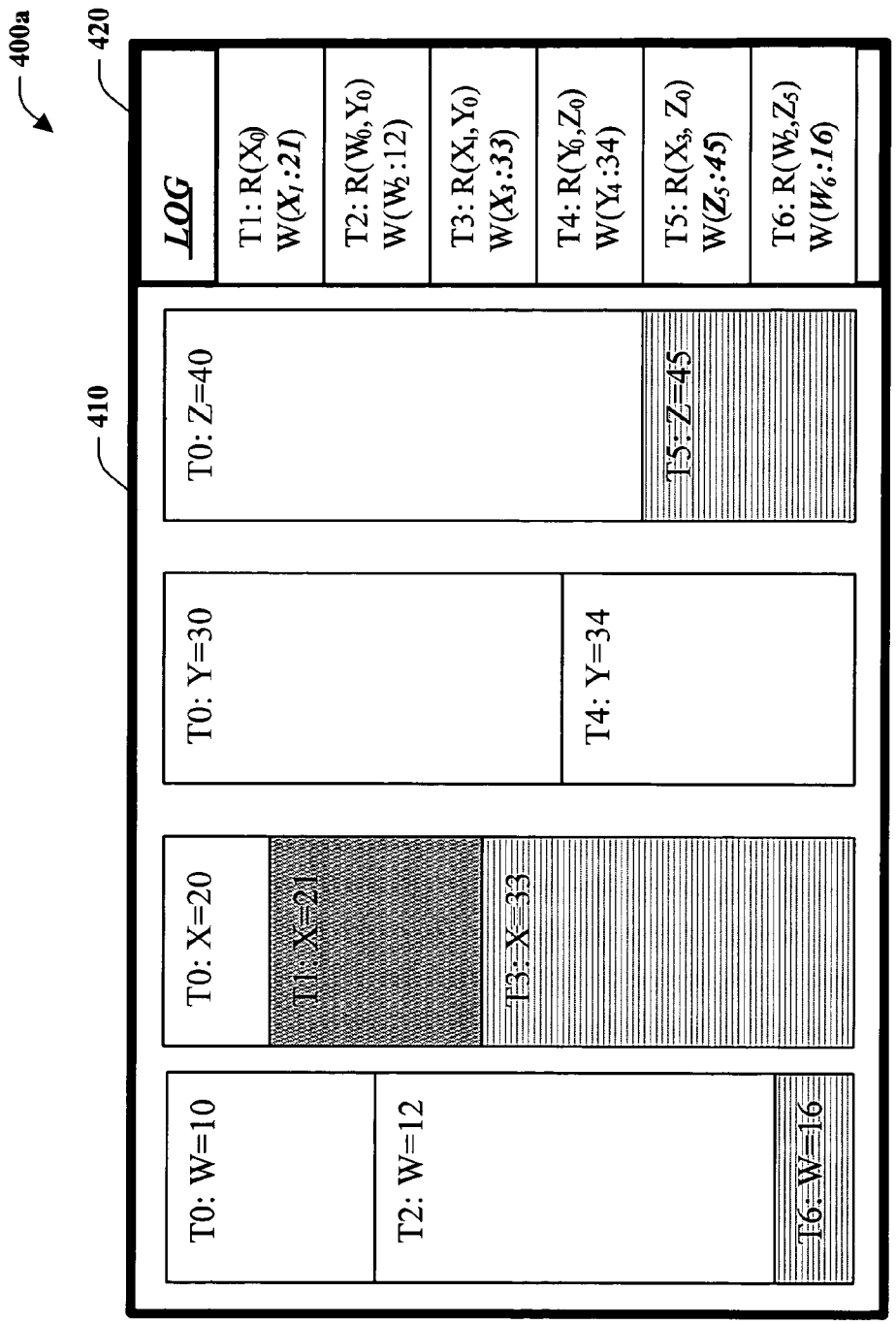
FIG. 4a is a graphical illustration of a data store and log associated with an exemplary corruption recovery system.
Figure 4B:
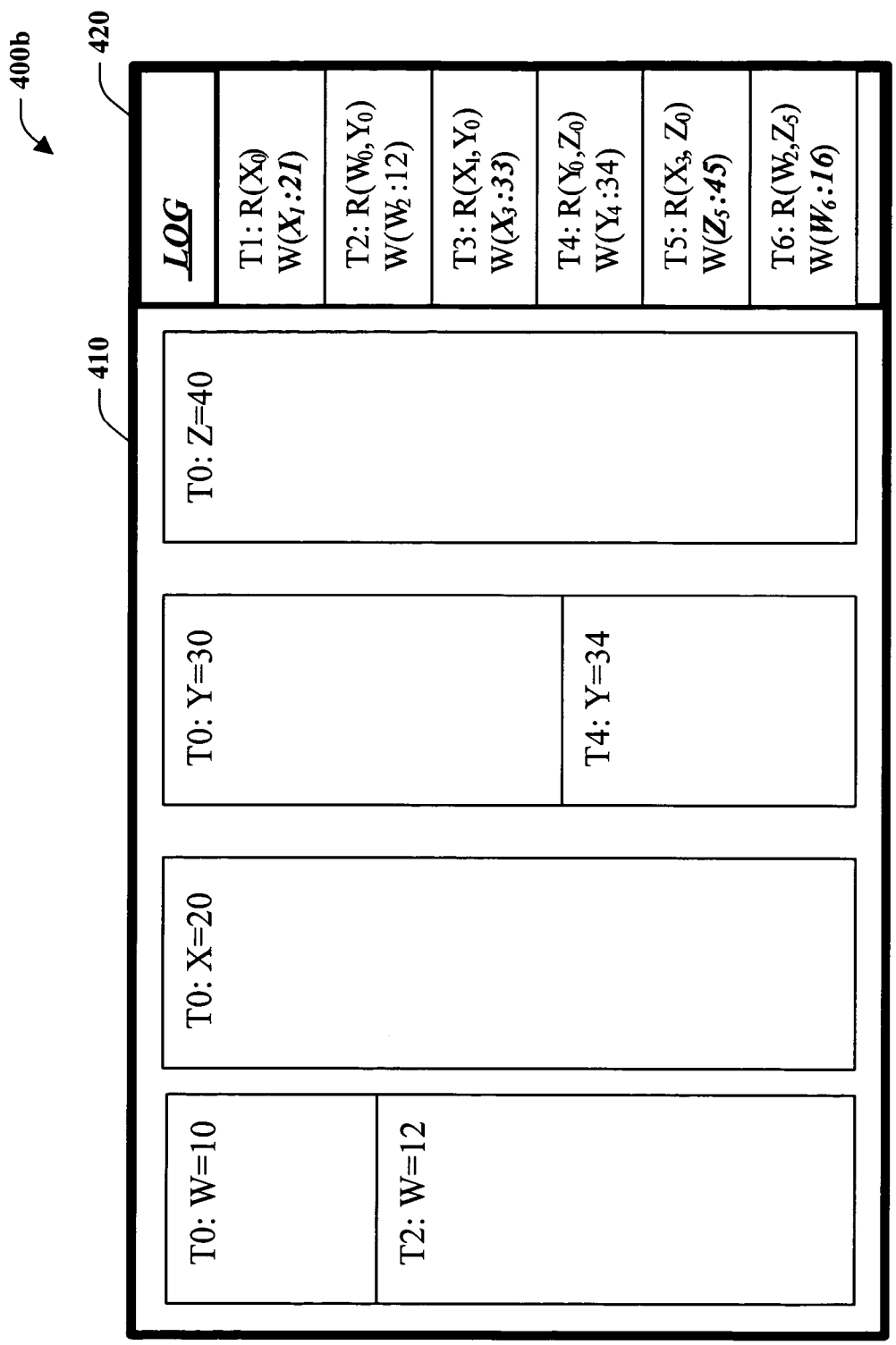
FIG. 4b is a graphical illustration of a data store and log associated with an exemplary corruption recovery system.

To facilitate clarity and understanding a corruption example will be discussed relative to FIGS. 4a and 4b. By way of example and not limitation, assume there is a transaction time database 410 with corrupt data and a transaction log 420 associated therewith as is provided by example 400a of FIG. 4a. In this instance, the database 410 includes four data items or variables, W, X, Y, and Z, as well as a number of versions of each item. Each item has an initial value at time zero, namely W=10, X=20, Y=30, and Z=40. Transaction log 420 includes a list or transactions including the data items read and the items written. The first transaction denotes that at time one (T1), the version of X at time zero ($X_0$) was read and a new version at time one (T1) was created (X1) such that the new value of X is twenty-one. At time two (T2), a transaction was executed that read the initial values of W ($W_0$) and Y ($Y_0$) and wrote a new version of W ($W_2$). The log continues until time six (T6). Assume that the first transaction at time $T_1$ is determined to be corrupt. Accordingly, its write set ($X_1$) is corrupt and is illustrated as such via dark shading. Analysis by the closure component 210 (FIG. 2) of the quarantine component 120 (FIGS. 1 and 2) can indicate that transaction three at time three (T3) is also corrupt as it reads X1 and writes a new value $X_3$. This can be marked as corrupt by the invalidator component 220 (FIG. 2) as illustrated with horizontal striped lines. Further, transaction five, at time five (T5), reads $X_3$ written by transaction three, so its write of $Z_5$ is also corrupt and marked, here with stripped lines. Finally, transaction six time six (T6) reads $Z_5$ and writes $W_6$, accordingly the version of W at time six (T6) is also corrupt and marked with striped lines.

After the corrupted versions of data are marked as invalid, the system permits transaction processing to resume. The effect of such execution should be as if the transactions writing invalid data had never executed. That is, the intent is to "de-commit" transactions producing invalid items and remove their effects. Hence, when an invalid version of data item d is read [I(d)] the system ignores this version and scans back in time through versions of d looking for the first earlier version that is valid. This is the value of d that is returned.

Conceptually, the time range of the earlier uncorrupted version of d is extended to include the ranges of all contiguously following corrupted versions of d. This is illustrated for clarity in FIG. 4b, using the example of FIG. 4a, above. When the corrupted data is marked, the effect is to logically remove these versions. This means that, in effect, the values for the data items or variables going forward is W=12, X=20, Y=34, and Z=40. With that understanding, the database state can be exploited leaving the versions of data marked as invalid in place so as to document the corruption(s), which can be a very useful capability.

When an update is performed, a new and valid version of each data item is introduced and written. This version can be timestamped with a start time that is the time assigned to the transaction, for example at its commit. When update transactions read, they can read uncorrupted predecessors, and hence it is these uncorrupt predecessors that are updated.

Figure 5:
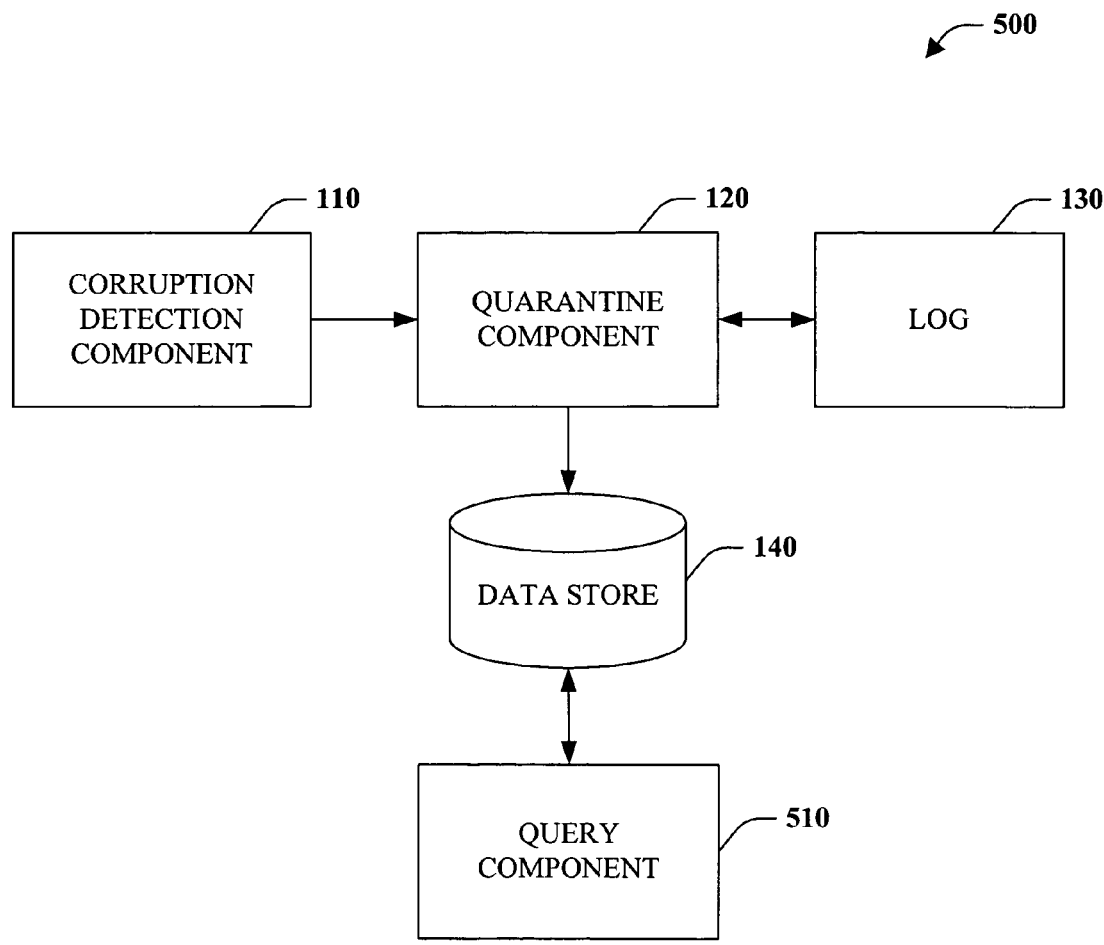
FIG. 5 is a block diagram of a corruption recovery system in accordance with an aspect of the subject invention.

Turning to FIG. 5, a corruption recovery system 500 is illustrated in accordance with an aspect of the subject invention. Similar to system 100 of FIG. 1, system 500 can include corruption detection component 110, quarantine component 120, transaction log 130 and data store 140. As previously described, corruption detection component 110 can detect and/or facilitate detection of an initial corrupt transaction and/or data item and communicate identifying information to the quarantine component 120. The quarantine component 120 receives this information and utilizes it and data from the transaction log 130 to determine if there are any data items that are also corrupt by virtue of their dependency on the initial corruption. Additionally, the quarantine component 120 can subsequently quarantine corrupt data from valid data by marking them invalid in the data store 140. In addition to these components, recovery system 500 can include a query component 510. Query component 510 is operative to receive and execute queries on valid as well as invalid data items. Enabling explicit querying of corrupt data can be very useful. For instance, such data could be examined and perhaps even altered to make it valid once again. One might read corrupt data by engaging the query component with a query such as a SQL query that, among other things, specifically specifies corrupt data. For example, a SQL select statement can include a special "invalid" attribute that specifies that just invalid data that satisfies the other query constraints should be returned or alternatively for purposes of the query invalid data should be treated as if it were valid. Execution of queries against the data store 140 utilizing query component 510 is surely useful especially when the purpose is to understand all the activity going on for a database, as auditors or administrators often have a need to do.

Figure 6:
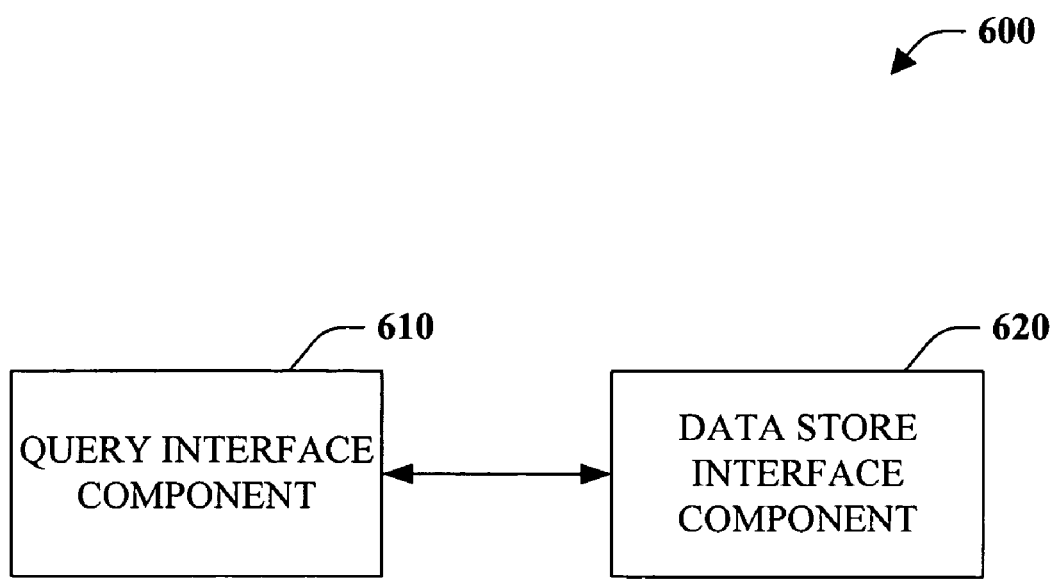
FIG. 6 is a block diagram of a query interface system in accordance with an aspect of the subject invention.

FIG. 6 illustrates a query interface system 600 in accordance with an aspect of the subject invention. Query interface system 600 can be an interface between a user or application program and the query execution component 510 of FIG. 5. Accordingly, system 600 can correspond to an application program interface (API). Interface system 600 can include two components a query interface component 610 and data store interface component 620. Query interface component 610 is operative to receive queries from a user, application program, or other entity. Furthermore, it should be noted and appreciated that query interface component 610 can receive queries concerning invalid or corrupt data. For example, it can receive a SQL query that specifically specifies that invalid data should be returned or alternatively the query can specify that results be generated based on valid and invalid data, or solely valid data. Data store interface 620 receives a query from the query interface component 610 and subsequently provides query results back the query interface component 610. The data store interface 620 can interact with a query component or query execution engine to retrieve the results provided back to the query interface component 610.

Figure 7:
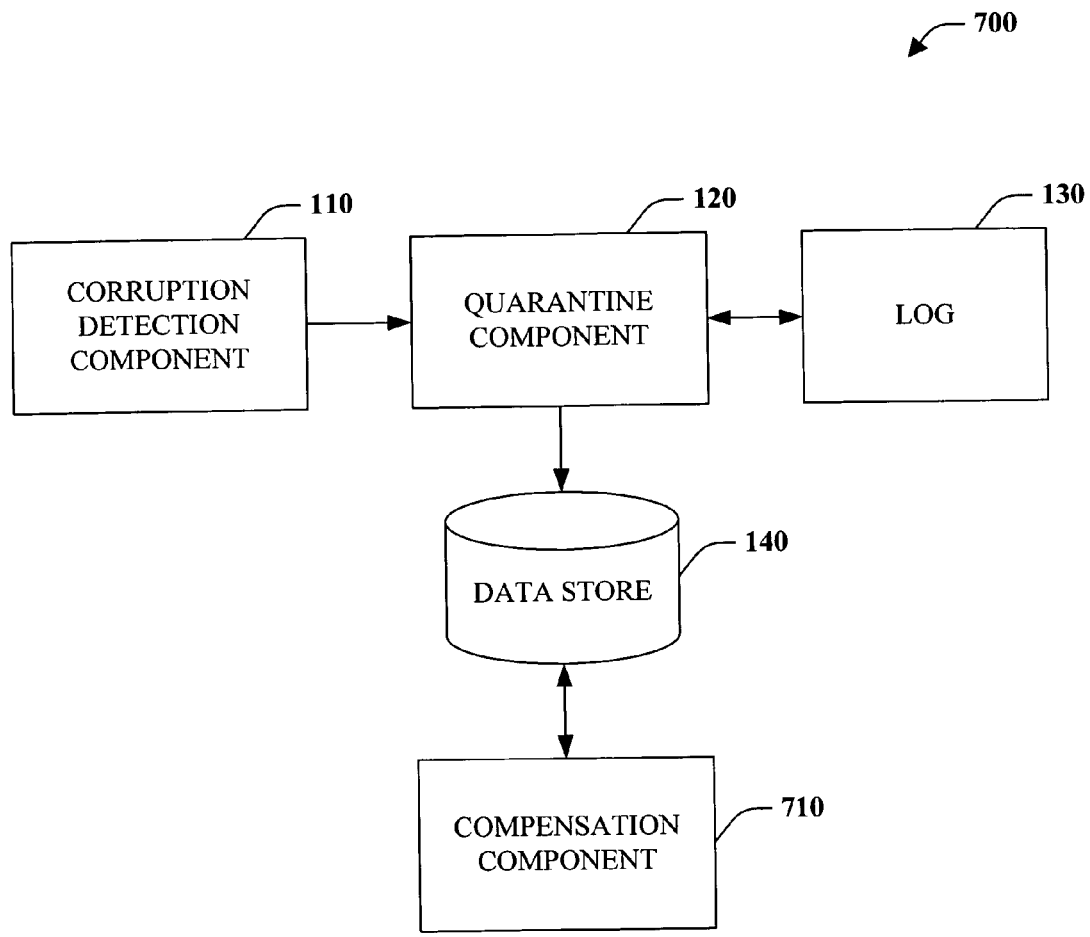
FIG. 7 is a block diagram of a corruption recovery system in accordance with an aspect of the subject invention.

FIG. 7 depicts a corruption recovery system 700 in accordance with an aspect of the subject invention. Recovery system 700 can include a corruption detection component 110, a quarantine component 120, a transaction log 130, a data store 140, and a compensation component 710. As described with respect to systems 100 (FIG. 1) and 500 (FIG. 5), corruption detection component 110 can detect an initial transaction and/or associated data corruption and provide information identifying the corruption to quarantine component 120. Quarantine component 120, with help from the information stored in the transactional log 130, can determine additional corruptions derived by dependency on the initial corruption. Additionally, the quarantine component 120 can then isolate corrupt and valid data by marking invalid or corrupt data in the data store 140. Compensation component 710 alone or in conjunction with user input can provide a mechanism for analyzing the marked corrupted data, generating and applying a compensating action to offset the corruption. In this manner, invalid data can be made valid. Furthermore, it should be appreciated that compensation component 710 can infer a corrective action utilizing intelligent and/or adaptive systems and methodologies including by not limited to neural networks, Bayesian networks, and expert or knowledge systems. By way of example, a bank account might have been corrupted by having an erroneous withdrawal posted. That might have resulted in the balance becoming negative and a fee being assessed in a statement sent to the owner of the bank account. Compensation component 710 can create and apply a corrective action for this corrupted item including but not limited to re-executing the subsequent transactions, hence avoiding both the negative balance and the assessment of the fee and generating a new statement showing that the problem has been corrected.

Figure 8:
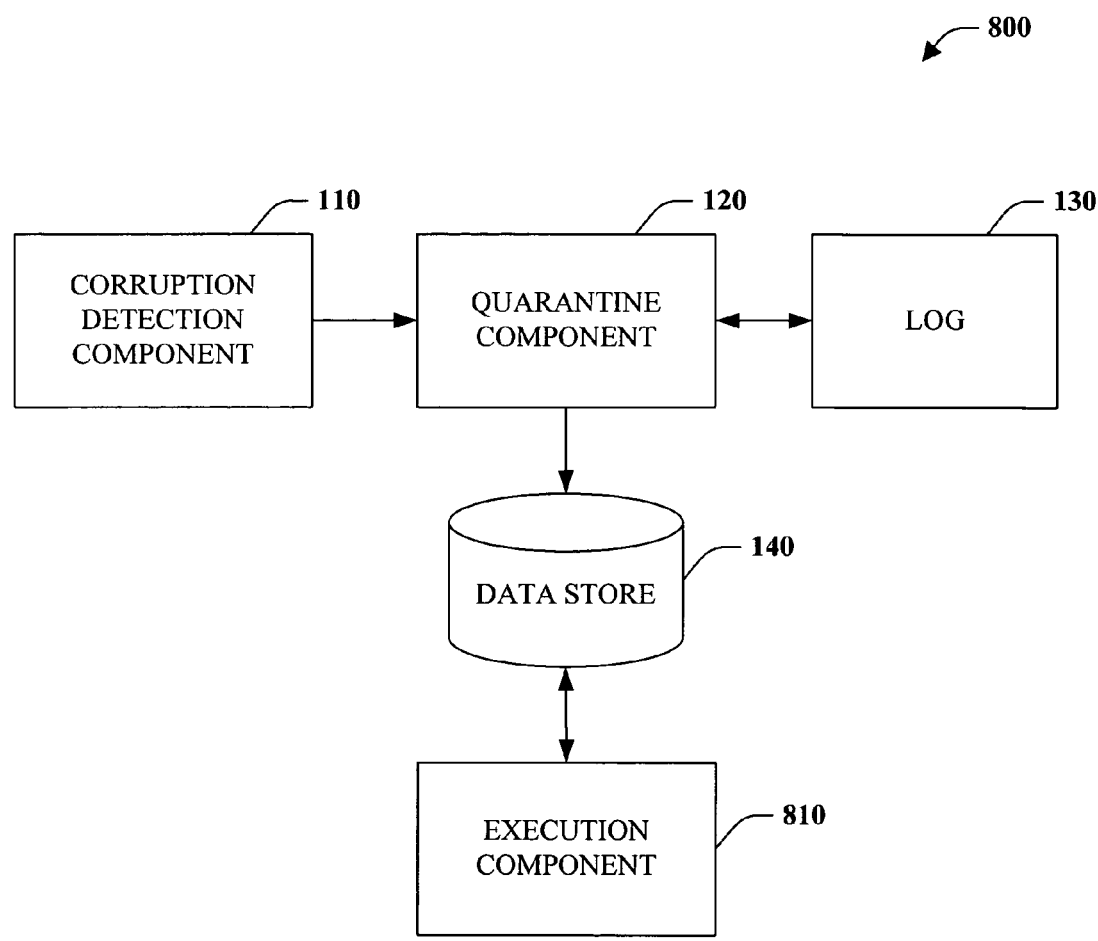
FIG. 8 is a block diagram of a corruption recovery system in accordance with an aspect of the subject invention.

FIG. 8 illustrates a corruption recovery system 800 in accordance with an aspect of the subject invention. Similar to systems 100, 500, and 700, system 800 can include a data store 140 that stores data items, a corruption detection component 110 to detect an initial corruption, and a log component 130 that stores transaction information. In addition, system 800 can include a quarantine component 120 that receives or retrieves input from detection component 110 and transaction log 130, identifies all corrupted items related to the initial corruption, and marks or quarantines them as invalid on the data store 140. Moreover, system 800 also includes an execution component 810. Execution component 810 can execute or process transactions on the data store 140. Furthermore, execution component 810 can implement concurrency control systems and methods for example utilizing one or more of locks (e.g., via a lock manager (not shown)) and timestamps to the ensure compliance with a fundamental property of transaction processing called serializablility. Execution component 810 can also facilitate execution of transactions on a database including one or more invalid data items or versions thereof. According to one aspect of the subject invention, execution component 810 can process transactions as if the transactions writing invalid data had never executed. With a transaction-time database, a transaction that seeks to execute on invalid data will execute on a previous valid version of data. According to another aspect of the subject invention, execution component 810 can re-execute de-committed transactions in an effort to correct invalid data. Thus, one or more corrupt transactions and associated data items need not halt transaction processing by the execution component 810.

Figure 9:
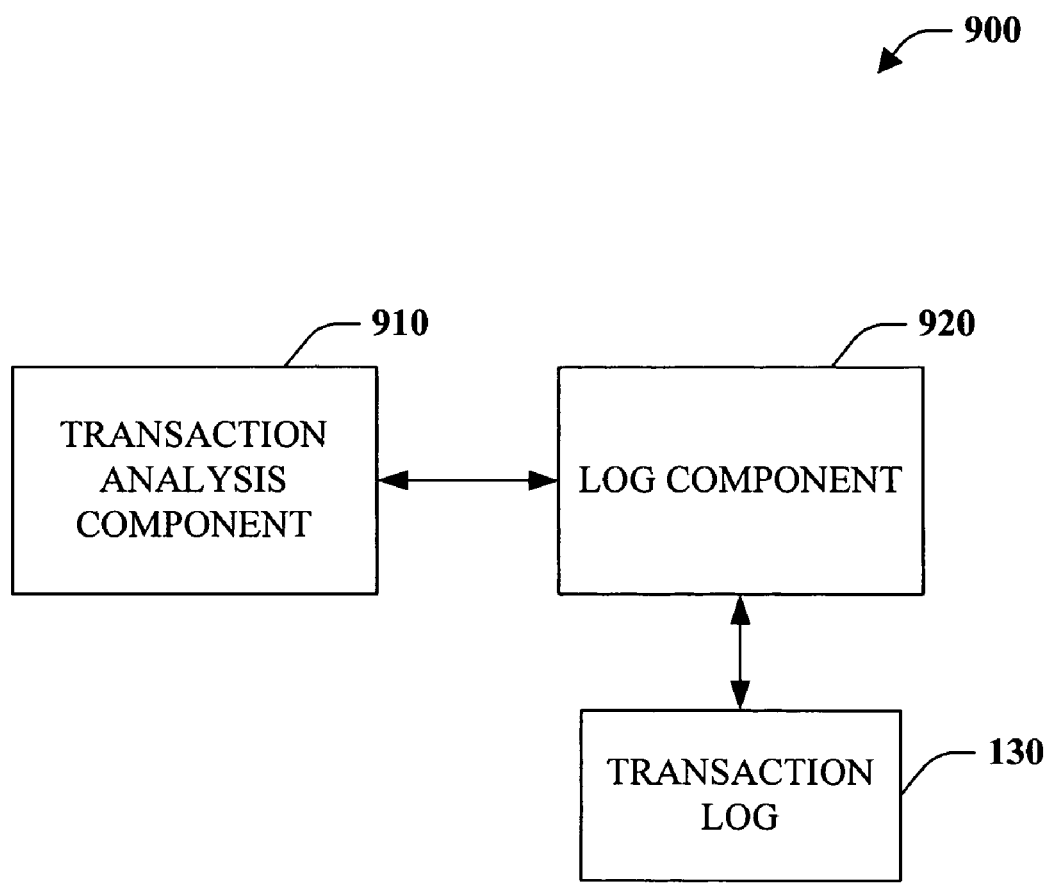
FIG. 9 is a block diagram of a system to facilitate corruption recovery in accordance with an aspect of the subject system.

FIG. 9 illustrates a system 900 to facilitate corruption recovery in accordance with an aspect of the subject invention. System 900 can provide the support mechanism for the aforementioned recovery systems by maintaining a transaction log 130. System 900 can include transaction analysis component 910, log component 920 and transaction log 130. Transaction analysis component 910 can evaluate transactions and the data items they affect. More specifically, analysis component 910 can determine which data items a transaction reads and which data items a transaction writes, for instance at commit time. This information can then be provided to the log component 920. Log component 920 is communicatively coupled to transaction analysis component 910 and maintains transaction log 130. Transaction log 130 can be a data store or other computer readable medium. Log 130 can record transaction events. For each transaction, there can be a read log record documenting the data items read by the transaction as well as write or update log records that document the data items written. Upon receipt of information from the transaction analysis component 910, the log component 920 can write transactional information to the transactional log 130.

It should be appreciated that some data store applications (e.g., transaction applications . . . ) will do extensive amounts of reading prior to changing some much smaller part of the database state. This can cause the size of the read log record to become very large. Further, the size of the data structure needed to remember this information during transaction execution until the moment of commit when the read log is written could likewise be very large. It is typically awkward to deal with large numbers of resources. Each resource should be identified unambiguously. Maintaining such a data structure is not difficult, but it can put pressure on the data store and a data store storage manager, which adds to the costs involved.

The aforementioned problem, namely of a very large number of resources, is not unique to the subject invention logging reads. It arises as well when transactions need to lock resources to provide transaction isolation. Accordingly, the subject invention can deal with the issue in a similar manner, namely by introducing multi-granularity resources. The subject invention can utilize the same or similar hierarchy for identifying resources as is done for locking. One clear advantage of using the locking resource hierarchy is that one can know immediately how resource containment is defined, and have a way of determining when resource usage conflicts or intersects. Thus, the subject invention can determine when a transaction has read corrupt data, even when the resources are described at different levels of granularity.

The traditional lock resource hierarchy usually includes at least table, page, and record. The granularity is changed from fine grained to larger grain when too many small-grained resources are being exploited by a transaction. This scheme can be adapted to the subject invention technique of logging the identities of data items that a transaction reads. A lock manager, which can be a component as that term is defined herein, can be exploited in this process. For example, when read locks are held to the end of a transaction, all data items read are effectively remembered by the lock manager. At commit time, while releasing read locks from these resources, the subject invention can simultaneously record these resource identifiers in the log.

Sometimes read locks are not held to the end of transactions, for instance when degree two transactions are executed. In that case, the lock manager resource "lock block" can be left in a lock manager conflict table changing the lock mode from "read" (share) to "has been read," which is treated, as far as conflicts are concerned, as if there were no lock at all. This permits such transactions to exploit the same strategy for populating the transaction log with the identifiers for all resources read by the transaction.

The aforementioned systems have been described with respect to the interaction between several components. Furthermore, for purposes of clarity and simplicity a number of systems were provided and described to emphasize an aspect of the subject invention. It should be appreciated that such systems can include those components specified therein, some of the specified components, and/or additional components specified in other systems. For example, a corruption recovery system can include a query component, a compensation component, and an execution component or any combination thereof. Additionally, it should be noted that one or more components can be combined into a single component providing aggregate functionality or divided into several sub components. The components may also interact with one or more other components not specifically described herein, but known by those of skill in the art.

Furthermore, as will be appreciated by artisans of skill in the art, various portions of the disclosed systems above and methods below may include or consist of artificial intelligence or knowledge based components, sub-components, processes, means, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as well as efficient. For example, an artificial intelligence based component could be employed to facilitate detection of data corruption. Such a component could be utilized to detect data corruption alone or to supplement manual identification of data corruption by administrators, for instance. Additionally or alternatively, the artificial intelligence based systems, methods, and the like can be employed to facilitate generation and/or application of compensatory actions upon detection of data corruption.

In view of the exemplary systems described supra, methodologies that may be implemented in accordance with the present invention will be better appreciated with reference to the flow charts of FIGS. 10-13. While for purposes of simplicity of explanation, the methodologies are shown and described as a series of blocks, it is to be understood and appreciated that the present invention is not limited by the order of the blocks, as some blocks may, in accordance with the present invention, occur in different orders and/or concurrently with other blocks from what is depicted and described herein. Moreover, not all illustrated blocks may be required to implement the methodology in accordance with the present invention.

Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 10:
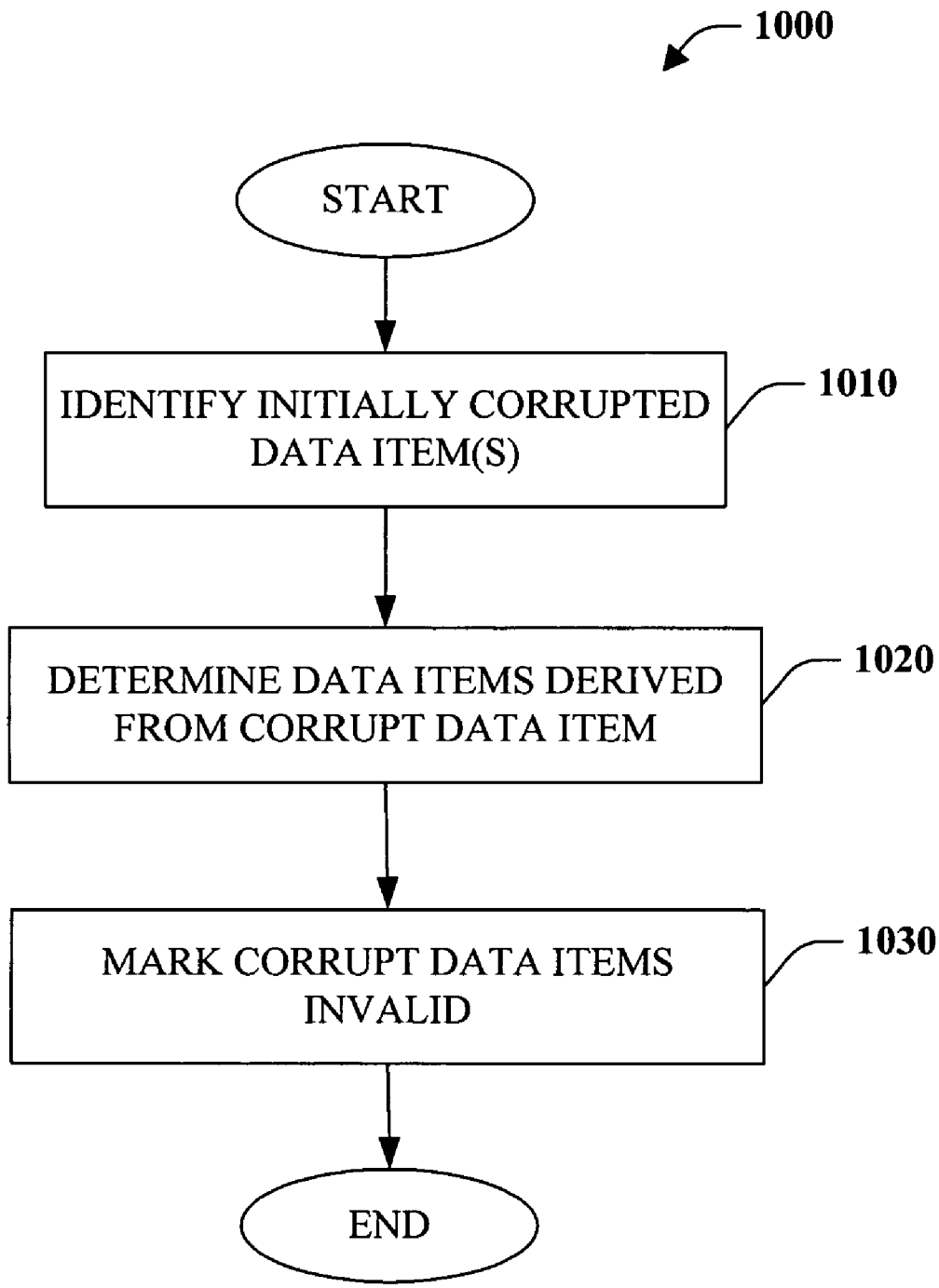
FIG. 10 is a flow chart diagram of a corruption methodology in accordance with an aspect of the subject invention.

Turning to FIG. 10, a corruption methodology 1000 is depicted in accordance with an aspect of the subject invention. Methodology 1000 provides a procedure for coping with corruption. At 1010, initially corrupt data items are identified. A user or administrator can identify corrupt data items manually, automatically utilizing artificial intelligence, knowledge based systems and methodologies or some combination thereof. By way of example, a data item can be identified as corrupt after a determination is made that a transaction was corrupt such as one that incorrectly debits an account. At 1020, data items derived from the initially corrupt data item are determined. For instance, if a transaction reads a corrupt data item and based on that read writes or updates a second data item, then that second data item is also corrupt by virtue of its dependency of the initially corrupt item. To facilitate identification of these derived corrupt items, a transaction log may be consulted, which identifies data items read and updated for each transaction. At 1030, the corrupt data items both initial and derived can be marked as invalid. For example, data item headers or metadata can be marked as such. For instance, they may have a Boolean variable "valid" that is either true or false. If it is false, then the data is invalid.

Figure 11:
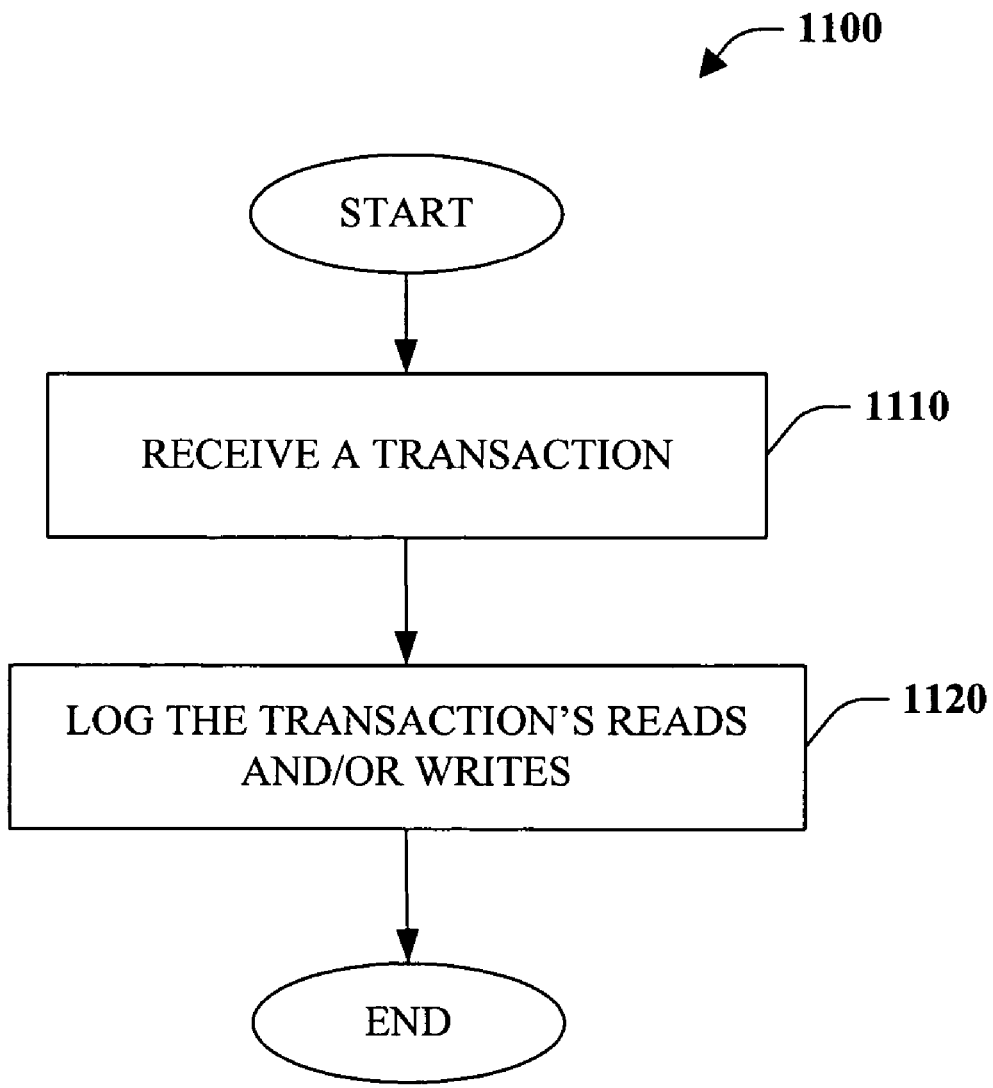
FIG. 11 is a flow chart diagram of a support methodology for a corruption recovery system in accordance with an aspect of the subject invention.

FIG. 11 is a support methodology 1100 for a corruption recovery system in accordance with an aspect of the subject invention. At 1110, a transaction is received or identified, wherein the transaction includes operations on one or more data items. At 1120, the operations are logged in a computer readable medium. For example, the transactions read operations can be logged in a read record identifying the data items read by the transaction. Similarly, the transaction's write or update operations can be logged in write or update records specifically identifying the data items written by the transaction. This transaction log can subsequently be utilized to identify data items dependent upon a corrupt transaction or data item.

Figure 12:
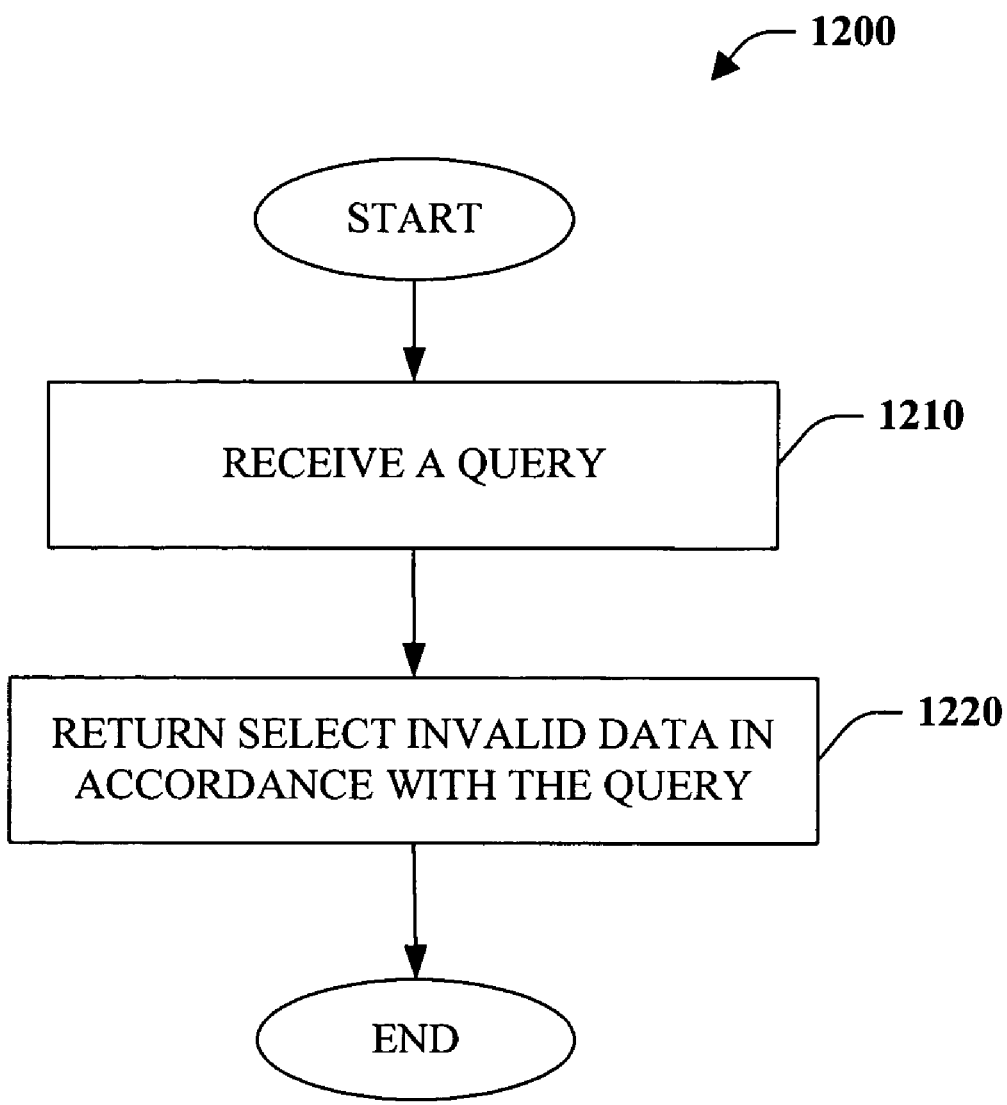
FIG. 12 is a flow chart diagram of a method of interacting with a data store in accordance with an aspect of the subject invention.

FIG. 12 illustrates a method 1200 of interacting with a data store in accordance with an aspect of the subject invention. At 1210, a query is received. The query can specify invalid data to be retrieved. For example, the query can be a SQL Select query with a special keyword indicating that invalid data should be considered. At 1220, selected invalid data is returned in accordance with the specified query. Method 1200 thus enables exploration of invalid data. This can be extremely useful to facilitate examination and perhaps alteration of such data to make it valid once again.

Figure 13:
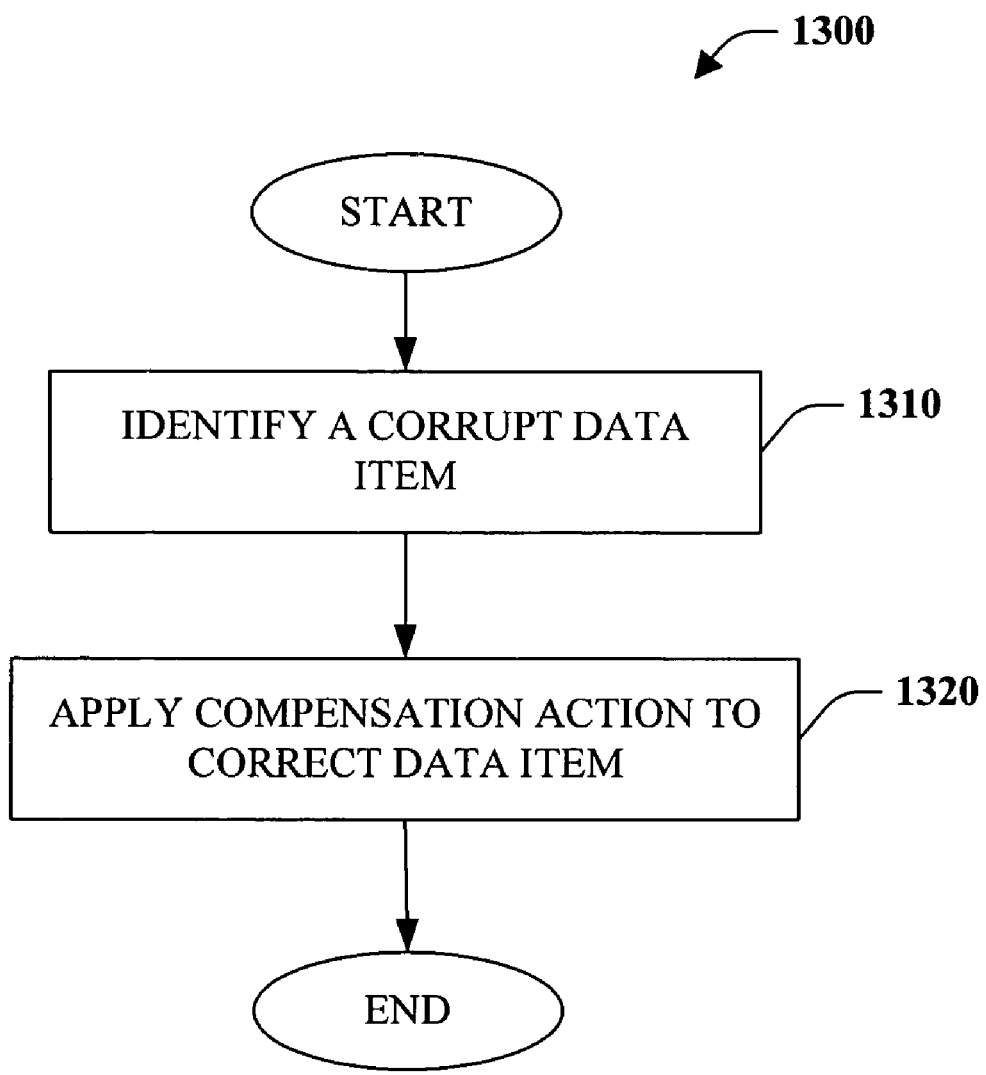
FIG. 13 is a flow chart diagram of a method of interacting with corrupt data in accordance with an aspect of the subject invention.

FIG. 13 is a flow chart depicting a method 1300 of interacting with corrupt data. As described above, it is very useful to be able to identify and ultimate correct invalid data. Method 1300 specifies one such process. At 1310, a corrupt data item is identified. Such an item can be identified, for instance, by querying a data store for data items marked as invalid. For example, a data item may be recognized as invalid as a product of a corrupt transaction that incorrectly debited an account. At 1320, a corrective action can be applied to the data item to correct or validate the item. In the example presented above, such corrective action can be to execute transactions that credits the account for the amount incorrectly debited. It should be appreciated that this is a simplified example and the subject invention can provide much more complex corrective actions depending on the severity and extent of the of the corruption. Furthermore, artificial intelligence and knowledge based systems and methodologies among other adaptive systems and methods, can be employed to automatically generate and apply a corrective action.

Figure 14:
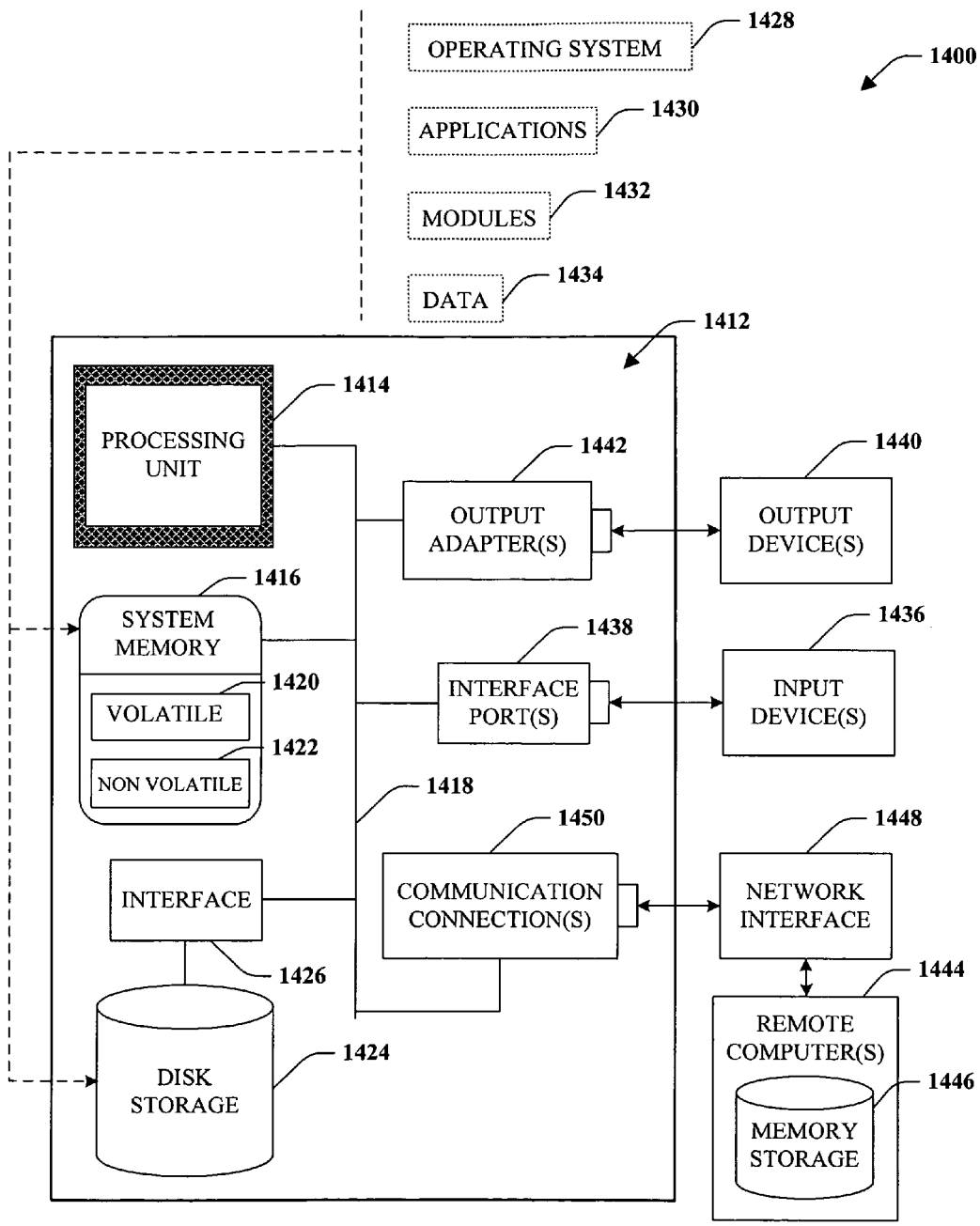
FIG. 14 is a schematic block diagram illustrating a suitable operating environment in accordance with an aspect of the present invention.
Figure 15:
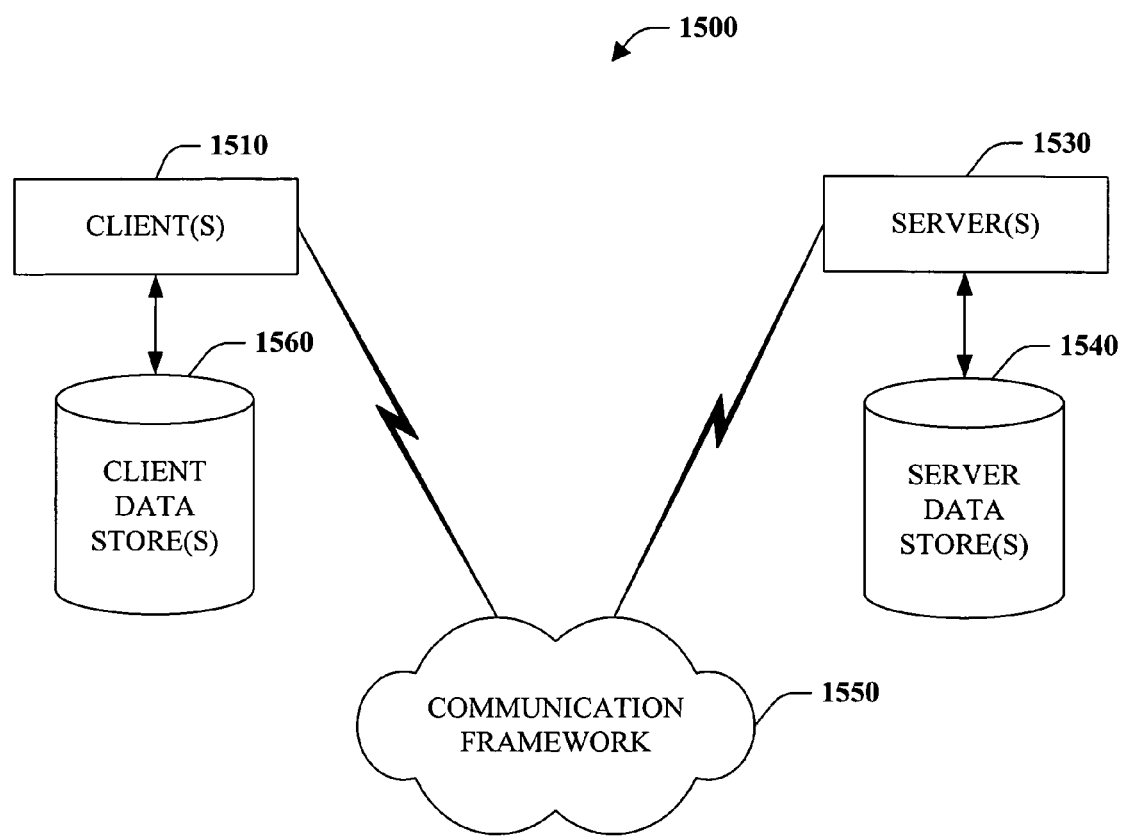
FIG. 15 is a schematic block diagram of a sample-computing environment with which the present invention can interact.

In order to provide a context for the various aspects of the invention, FIGS. 14 and 15 as well as the following discussion are intended to provide a brief, general description of a suitable computing environment in which the various aspects of the present invention may be implemented. While the invention has been described above in the general context of computer-executable instructions of a computer program that runs on a computer and/or computers, those skilled in the art will recognize that the invention also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices, microprocessor-based or programmable consumer electronics, and the like. The illustrated aspects of the invention may also be practiced in distributed computing environments where task are performed by remote processing devices that are linked through a communications network. However, some, if not all aspects of the invention can be practiced on stand-alone computers. In a distributed computing environment, program modules may be located in both local and remote memory storage devices.

With reference to FIG. 14, an exemplary environment 1400 for implementing various aspects of the invention includes a computer 1412. The computer 1412 includes a processing unit 1414, a system memory 1416, and a system bus 1418. The system bus 1418 couples system components including, but not limited to, the system memory 1416 to the processing unit 1414. The processing unit 1414 can be any of various available processors. Dual microprocessors and other multiprocessor architectures also can be employed as the processing unit 1414.

The system bus 1418 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1416 includes volatile memory 1420 and nonvolatile memory 1422. The basic input/output system (BIOS), containing the basic routines to transfer information between elements within the computer 1412, such as during start-up, is stored in nonvolatile memory 1422. By way of illustration, and not limitation, nonvolatile memory 1422 can include read only memory (ROM), programmable ROM (PROM), electrically programmable ROM (EPROM), electrically erasable ROM (EEPROM), or flash memory. Volatile memory 1420 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1412 also includes removable/non-removable, volatile/non-volatile computer storage media. FIG. 14 illustrates, for example disk storage 1424. Disk storage 1424 includes, but is not limited to, devices like a magnetic disk drive, floppy disk drive, tape drive, Jaz drive, Zip drive, LS-100 drive, flash memory card, or memory stick. In addition, disk storage 1424 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1424 to the system bus 1418, a removable or non-removable interface is typically used such as interface 1426.

It is to be appreciated that FIG. 14 describes software that acts as an intermediary between users and the basic computer resources described in suitable operating environment 1410. Such software includes an operating system 1428. Operating system 1428, which can be stored on disk storage 1424, acts to control and allocate resources of the computer system 1412. System applications 1430 take advantage of the management of resources by operating system 1428 through program modules 1432 and program data 1434 stored either in system memory 1416 or on disk storage 1424. It is to be appreciated that the present invention can be implemented with various operating systems or combinations of operating systems.

A user enters commands or information into the computer 1412 through input device(s) 1436. Input devices 1436 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1414 through the system bus 1418 via interface port(s)

1438. Interface port(s) 1438 include, for example, a serial port, a parallel port, a game port, and a universal serial bus (USB). Output device(s) 1440 use some of the same type of ports as input device(s) 1436. Thus, for example, a USB port may be used to provide input to computer 1412 and to output information from computer 1412 to an output device 1440. Output adapter 1442 is provided to illustrate that there are some output devices 1440 like displays (e.g., flat panel and CRT), speakers, and printers, among other output devices 1440 that require special adapters. The output adapters 1442 include, by way of illustration and not limitation, video and sound cards that provide a means of connection between the output device 1440 and the system bus 1418. It should be noted that other devices and/or systems of devices provide both input and output capabilities such as remote computer(s) 1444.

Computer 1412 can operate in a networked environment using logical connections to one or more remote computers, such as remote computer(s) 1444. The remote computer(s) 1444 can be a personal computer, a server, a router, a network PC, a workstation, a microprocessor based appliance, a peer device or other common network node and the like, and typically includes many or all of the elements described relative to computer 1412. For purposes of brevity, only a memory storage device 1446 is illustrated with remote computer(s) 1444. Remote computer(s) 1444 is logically connected to computer 1412 through a network interface 1448 and then physically connected via communication connection 1450. Network interface 1448 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit-switching networks like Integrated Services Digital Networks (ISDN) and variations thereon, packet switching networks, and Digital Subscriber Lines (DSL).

Communication connection(s) 1450 refers to the hardware/software employed to connect the network interface 1448 to the bus 1418. While communication connection 1450 is shown for illustrative clarity inside computer 1412, it can also be external to computer 1412. The hardware/software necessary for connection to the network interface 1448 includes, for exemplary purposes only, internal and external technologies such as, modems including regular telephone grade modems, cable modems, power modems and DSL modems, ISDN adapters, and Ethernet cards.

FIG. 15 is a schematic block diagram of a sample-computing environment 1500 with which the present invention can interact. The system 1500 includes one or more client(s) 1510. The client(s) 1510 can be hardware and/or software (e.g., threads, processes, computing devices). The system 1500 also includes one or more server(s) 1530. The server(s) 1530 can also be hardware and/or software (e.g., threads, processes, computing devices). The server(s) 1530 can house threads to perform transformations by employing the present invention, for example. One possible communication between a client 1510 and a server 1530 may be in the form of a data packet transmitted between two or more computer processes. The system 1500 includes a communication framework 1550 that can be employed to facilitate communications between the client(s) 1510 and the server(s) 1530. The client(s) 1510 are operatively connected to one or more client data store(s) 1560 that can be employed to store information local to the client(s) 1510. Similarly, the server(s) 1530 are operatively connected to one or more server data store(s) 1540 that can be employed to store information local to the servers 1530.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the terms "includes," "has," and "having" are used in either the detailed description or the claims, such term is intended to be inclusive in a manner similar to the term "comprising" as "comprising" is interpreted when employed as a transitional word in a claim.

What is claimed is:

1. A database corruption recovery system embodied on a computer readable storage medium comprising:
   a corruption detection component that facilitates identification of an initial corrupt data item in a transaction time database, the transaction time database storing multiple versions of the database associated with states of the database following transactions and a base version of the database prior to the transactions;
   a quarantine component that:
      receives the initial corrupt data item,
      identifies dependent or derived data items from a transaction log that are derived from or dependent on the initial corrupt data item,
      identifies ones of the dependent or derived data items that the transaction log indicates have been overwritten by transaction(s) that are not corrupt, and
      quarantines the initial corrupt data item and the derived or dependent data items that have not been overwritten by marking as invalid the initial corrupt data item and the derived or dependent data items that have not been overwritten, the marking as invalid including setting values in data item headers to indicate invalidity,
      wherein the identifying of the dependent or derived data items and the identifying of the ones of the dependent or derived data items are both performed based at least on reads and timestamps associated with transactions that wrote or overwrote the dependent or derived data items.

2. The system of claim 1, wherein the quarantine component includes a closure component that computes the closure of all data written by transactions impacted by the corrupt data.

3. The system of claim 1, wherein the data items marked as invalid are invisible to transactions.

4. The system of claim 1, wherein the log identifies data items read and/or written for each transaction.

5. The system of claim 4, wherein the data item reads by a transaction are consolidated into a single log record written immediately prior to transaction commit.

6. The system of claim 4, wherein the data items are multi-granular items identified by resource identifiers used in a lock manager and recorded on the log with these identifiers, the quarantine component identifies corrupt dependent items where read locks in transactions that have a write-read conflict that involve corrupt data in an earlier transaction, as such transactions have read corrupt data and consequently also written corrupt data.

7. The system of claim 1, further comprising:
a transaction analysis component that receives transactions and determines the data items with which the transaction interacted; and
a log component that receives information from the analysis component about the data items with which the transaction interacted and stores this information to a computer readable medium.

8. The system of claim 7, wherein the log component records read transactions in read log records and write transactions in update log records.

9. A database corruption recovery system embodied on a computer readable storage medium comprising:
means for identifying an initially corrupt data item in a transaction-time database, the transaction-time database storing multiple versions of the database associated with states of the database following transactions and a base version of the database prior to the transactions;
means for identifying data items derived from the initially corrupt data item of a transaction log;
means for identifying ones of the data items derived from the initially corrupt data item that the transaction log indicates have been overwritten by transaction(s) that are not corrupt; and
means for marking the initially corrupt data item and the derived data items that have not been overwritten as invalid, the marking as invalid including setting values in data item headers to indicate invalidity,
wherein the identifying of the dependent or derived data items and the identifying of the ones of the dependent or derived data items are both performed based at least on reads and timestamps associated with transactions that wrote or overwrote the dependent or derived data items.

10. A database corruption recovery method executing on one or more processors, comprising:
identifying an initially corrupt data item in a transaction time database, the transaction time database storing multiple versions of the database associated with states of the database following transactions and a base version of the database prior to the transactions;
identifying corrupt items that were derived from the initially corrupt data item of a transaction log;
identifying ones of the corrupt items that were derived from the initially corrupt data item that the transaction log indicates have been overwritten by transaction(s) that are not corrupt, and
marking the initially corrupt data item and the derived corrupt data items that have not been overwritten as invalid, the marking as invalid including setting values in data item headers to indicate invalidity,
wherein the identifying of the dependent or derived data items and the identifying of the ones of the dependent or derived data items are both performed based at least on reads and timestamps associated with transactions that wrote or overwrote the dependent or derived data items.

11. The method of claim 10, further comprising recording data item reads and writes for transactions in a log.

12. The method of claim 11, wherein identifying derived corrupt items includes computing the closure of all data items written by transactions impacted by the initially corrupt data.

13. The method of claim 10, further comprising executing transactions on the database that includes corrupt data that has been invalidated and is ignored.

14. The method of claim 13, wherein executing a transaction on an invalid item version comprises employing a last known valid version of the item.

15. The method of claim 10, further comprising executing a transaction on the database that compensates for the data items marked as invalid.

16. The system of claim 1, wherein:
each version of the database associated with a state of the database following a transaction stores only a differential between that version and a previous version, including data written or updated by the transaction, and
each version of the database associated with the state of the database following the transaction is identified by a timestamp of the transaction.

17. The system of claim 1, further comprising a query component configured to receive and execute a plurality of queries on corrupt data items, wherein a specific corrupt data item is identified during a query, examined and altered to transform the specific corrupt data item into a not corrupt data item, the queries specifying invalidity as a parameter that must be met in data items to be returned responsive to the queries.

18. The system of claim 9, further comprising:
means for processing non-recovery based transactions against the database while invalid data items exist in the database by employing a last known valid state of each of the invalid data items; and
means for receiving and executing a plurality of queries on the corrupt data items, wherein a specific corrupt data item is identified during a query, examined and altered to transform the specific corrupt data item into not a corrupt data item, the queries specifying invalidity as a parameter to be met in data items to be returned responsive to the queries.

19. The method of claim 10, wherein each version of the database associated with a state of the database following a transaction stores only a differential between that version and a previous version, including data written or updated by the transaction.

20. The method of claim 10, further comprising receiving and executing a plurality of queries on corrupt data items, wherein a specific corrupt data item is identified during a query, examined and altered to transform the specific corrupt data item into a not corrupt data item, the queries specifying invalidity as a parameter that must be met in data items to be returned responsive to the queries.

* * * * *